June 22, 1965  M. A. VAN DEN BERG  3,190,725
APPARATUS FOR THE TREATMENT OF NIGHT SOIL
Filed April 15, 1963
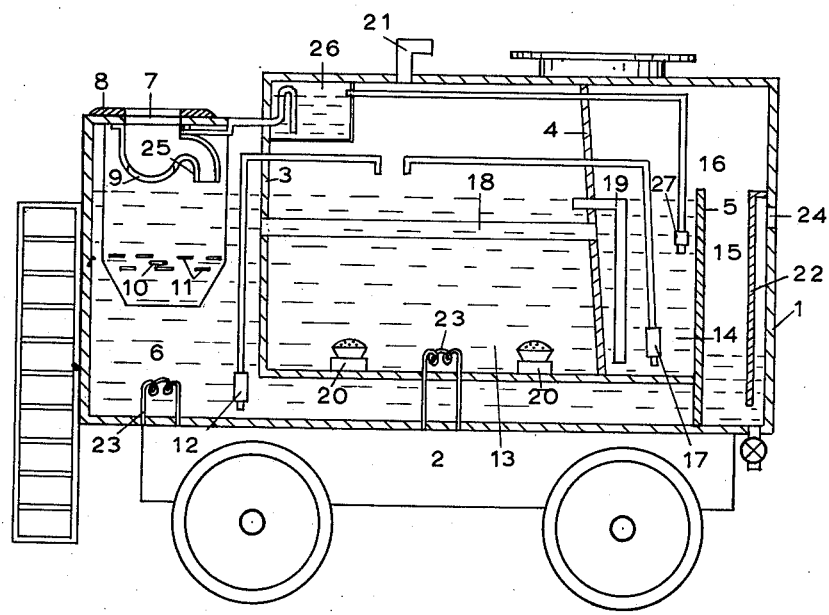
INVENTOR
MICHAEL ADRIAAN VAN DEN BERG
By Shoemaker and Mattare
Attys.

United States Patent Office 3,190,725
Patented June 22, 1965

3,190,725
APPARATUS FOR THE TREATMENT
OF NIGHT SOIL
Michael A. van den Berg, Klipfontein, Boksburg North, Transvaal, Republic of South Africa, assignor to Wright Anderson (South Africa) Limited, Boksburg North, Transvaal, Republic of South Africa
Filed Apr. 15, 1963, Ser. No. 272,985
Claims priority, application Republic of South Africa, May 10, 1962, 62/922
5 Claims. (Cl. 23—259.1)

This invention relates to a method and apparatus for the aerobic digestion of night soil or human excrement. While not confined thereto this invention has been developed for, and has particular application to underground mines, in which special sewage disposal problems exist. For example, it is not normally possible to install a waterborne sewerage system. Latrines located in fixed areas apart from the normal objections thereto, are unsatisfactory as there is continual advance of the working areas, and also night soil cannot safely be disposed of in the mine and must be hauled to the surface.

Equipment is known for the aerobic treatment of night soil in which the latter is flushed from a toilet bowl into a tank embodying aerating equipment, part of the effluent mixture in the tank being circulated for flushing purposes. Such equipment has a digestion rate sufficiently low to preclude its use as a unit of acceptable size in commercial applications where high loading occurs over short periods and where the unit is also required either to be mobile or to be transportable from one working site to another.

The present invention is to an extent based on the principles of operation of known installations suitable for the treatment of raw waterborne sewage and like waterborne wastes by the activated sludge process. Such known installations, however, necessarily involve laying of sewage piping and discharge of considerable quantities of effluent so that they are inherently unsuitable for the type of commercial applications referred to above.

Generally it is the object of this invention to provide a method and apparatus for the treatment of night soil particularly for use in underground mines but also applicable to other uses where highly loaded units are required which are sufficiently compact to be made mobile or be transportable.

In accordance with this invention there is provided a method of treating night soil comprising the direct discharge of the latter into a body of sewage effluent contained in a first compartment, admixture of the night soil and sewage effluent in said compartment, conveying the mixture to a second compartment and subjecting it to an aerobic digestion process to produce a sludge and sewage effluent, conveying the sludge and sewage effluent to a third compartment and allowing the sludge to settle therein, returning settled sludge from the third to the second compartment and sufficient of the supernatant effluent from the third to the first compartment to maintain a substantial body of effluent in said first compartment.

The apparatus for the aerobic digestion of night soil comprises a mixing chamber having an inlet for reception of night soil, an aeration chamber having therein aerating means for supplying air to material in said aeration chamber, and a settlement chamber for retention of a body of activated sludge and supernatant effluent, means for transferring activated sludge from the settlement to the aeration chamber, means for transferring the contents of the mixing chamber to the aeration chamber, the contents of the aeration chamber to the settlement chamber and returning supernatant effluent from the settlement chamber to the mixing chamber.

Apparatus according to this invention and suitable for use in an underground mine is illustrated diagrammatically in the accompanying drawing which is a sectional side elevation of a mobile aerobic digestion tank.

As shown in the drawing, there is provided a small tank comprising a vessel 1 of any suitable shape mounted on a rail bogie 2. The vessel 1 is divided by upright partition members 3, 4 and 5 into four compartments. The first compartment is a vented liquid reservoir and mixing chamber 6 having a suitable number of inlets 7 fitted with lavatory seats 8 through which night soil is discharged directly into the mixing chamber 6. The seats 8 may be mounted on lavatory bowls 9 which may have provision for the flushing thereof as more fully explained hereafter.

The mixing chamber 6 is also provided with mixing and if necessary, a comminution device. For example, the contents of the mixing chamber 6 may be swirled by a stirrer or compressed air jets 10 to effect in combination with fixed cutters 11 comminution of the solids. The mixing chamber 6 is also provided with means such as a motor driven pump or air lift pump 12 whereby the contents of the mixing chamber may be transferred to the second compartment.

The second, third and fourth compartments comprise in order, an aeration chamber 13, a settlement chamber 14 and a final effluent collection chamber 15 connected to the settlement chamber 14 or sludge hopper by a weir 16 formed by the top of partition 5. The bottom of the settlement chamber 14 is connected by an air lift pump 17 or other means to the inlet end of the aeration chamber 13 so that the activated sludge settling in the settlement chamber 14 may be admixed with the material discharging into the aeration chamber 13 thereby promoting the aerobic digestion thereof.

The final effluent collection chamber 15 acts as a reservoir from which the effluent may be periodically or continuously discharged.

While it is necessary to put water into the apparatus at the start of operations to form an artificial sewage, thereafter the sewage effluent is used for this purpose. This effluent is conveniently the supernatant liquor in the upper part of the settlement chamber 14 and is transferred by a pump and/or pipe 18 connecting the settlement chamber 12 to the mixing chamber 6. The transfer of sludge and effluent from the aeration to the settlement chamber 14 is by overflow through the pipe 19 projecting through the partition wall 4 and discharging at the bottom of the settlement chamber 14.

In the aeration chamber 13 are fitted aerators 20 of a known type and compressed air pipes (not shown) are connected to aerators 20, jets 10 and air lift pumps 12 and 17. At the top of the aeration chamber 13 is provided an air outlet 12.

For use the tanker is conveyed to a required point in the mine and connected up to the normally available compressed air supply or to a compressor if a piped compressed air supply is not available. The tanker is then used as a normal latrine the material discharged into the mixing chamber 6 being admixed therein initially with water so that in effect it forms an artifically made equivalent of normal waterborne sewage. This material is then periodically or continuously discharged into the aeration chamber 13 being mixed with activated sludge conveyed by pump 17 during the discharge into said aeration chamber 13. Thereafter the material in the aeration chamber is subjected to aerobic digestion and flows via overflow pipe 19 into the settlement chamber 12 where the solids are largely separated from the effluent, part of which may, under certain conditions, flow over weir 14 into the final collection chamber 13 from which it may be periodically removed. Chamber 13 is fitted with a baffle 22.

It is a feature of this invention that the appartus may be run not only without any build up of effluent whatsoever, but with such a small build up of sludge and salts that it appears that practical units in operation at present in underground mines can be operated for several years without desludging and/or effluent liquor discharge, when used at designed capacity, the period being reduced when the apparatus is overloaded.

An indication of this was given in a test on an early experimental unit of the type shown in the drawings and of 125 cubic foot capacity in which it was found with an input of 20 gallons of night soil per day that the unit could be run, for 102 days without desludging and without any build up of mineral salts or other material sufficient in any noticeable manner to inhibit the aerobic digestion process. During the period of this test there was a removal of sludge in very small quantities for sampling purposes only. A typical analysis of the final effluent obtained towards the end of the test period was:

| | | |
|---|---|---|
| $NO_3$—N | p.p.m. | 120–160 |
| $NH_3$—N | p.p.m. | 6 |
| Kjeldahl [1]—N | p.p.m. | 100 |
| C.O.D. [2] | p.p.m. | 1500 |
| pH | | 7.2–7.5 |

[1] Kjeldahl—reading based on Kjeldahl's method for the quantitative estimation of nitrogen in organic compounds.
[2] C.O.D.—abbreviation for chemical oxygen demand.

In this test there was a discharge of clear effluent liquor averaging 15 gallons per day into the effluent collection chamber 13.

However, in the units in practical operation in underground mines it has been found unnecessary to discharge any effluent liquor from the system but on the contrary it is often necessary to add water to maintain liquid levels. This is due to the fact that the rate of evaporation of the water vapour from the effluent has at least equalled the rate of input of the water content of the night soil into the system, in spite of operation under very humid conditions (e.g. about 80° F. dry bulb and 70° F. wet bulb temperatures). With such humid conditions the required evaporation rate was achieved by use for aeration of available highly compressed air (about 90 p.s.i.) which was reduced to 1½ to 2 p.s.i. before being fed to the aerators. The air used for aeration was consequently very dry relative to the ambient air and promoted the required evaporation.

Where necessary evaporation may be promoted by increasing the aeration beyond that necessary for aerobic digestion and/or by heating the effluent using the heating coils 23. The coils 23 have a main application under cold conditions.

The main and carbonaceous content of the night soil is discharged mainly as carbon dioxide which results from oxidation of the carbonaceous matter in the mixing chamber by nitrates in the recirculated effluent. The carbon dioxide is also formed by oxidation of the carbonaceous matter in the aeration chamber 13 in which oxidation of nitrites to nitrates will also ocur. Due to the fact that there is no appreciable build up of nitrogenous matter the latter would also appear to be largely discharged in the form of nitrogen gas. Other elements such as sodium potassium chlorine phosphorous and sulphur in the form of sulphates are normally present in the effluent and not discharged from the system, but they occur in such small quantities that they do not interfere with long periods of operation without desludging or effluent discharge.

If circumstances are such that it is not possible to operate without periodic discharge of effluent this is no serious disadvantage since the quantities are small and under proper operation will be of good quality. Such small quantities of discharged effluent are also easily and economically treated with disinfectant in the collection chamber 15 if desired. For this purpose the baffle 22 is fitted in chamber 15 and an open outlet 24 is provided and positioned below the top of weir 16.

The bowls 9 may be eliminated altogether to allow for direct defecation into the mixing chamber 6 in which case the flushing system is also eliminated. Where the bowls 9 are used they may be provided with a bottom trap 25 and connected to a flushing cistern 26 supplied with effluent by an air lift pump 27 connected to the upper part of the settlement chamber 14. The cistern 26 may be either of the known types which flush periodically and automatically every time they are filled to a predetermined level or which are flushed by operation of a lever or the like.

It will be appreciated that the rate of flow through the pumps and control of all stages of the process is effected by the rate of air supply to the pumps and aerators and that all necessary drain cocks and the like are provided. Also while a mobile unit has been described as applied to mining operations the invention is not confined to this modification or field of use.

What I claim as new and desire to secure by Letters Patent is:

1. Transportable apparatus for the aerobic digestion of night soil comprising a mixing chamber, an inlet for discharge of night soil into the mixing chamber, an aeration chamber, a vent connecting the aeration chamber to atmosphere, an aerator in the aeration chamber, and a settlement chamber for retention of a body of activated sludge and supernatant effluent, means for transferring activated sludge from the settlement to the aeration chamber, means for transferring the contents of the mixing chamber to the aeration chamber, the contents of the aeration chamber to the settlement chamber and returning supernatant effluent from the settlement chamber to the mixing chamber.

2. Transportable apparatus in accordance with claim 1 including a lavatory seat fitted on the inlet, a toilet bowl fitted below the inlet and discharging into the mixing chamber, and means for conveying supernatant effluent from the settlement chamber to flush the toilet bowl.

3. Transportable apparatus in accordance with claim 1 including a mobile tanker enclosing the mixing, aeration and settlement chambers.

4. Transportable apparatus in accordance with claim 1 including heating equipment fitted in the aeration chamber.

5. Transportable apparatus in accordance with claim 1 including a collection chamber for reception of excess material in the settlement chamber and an overflow connection between the settlement and collection chamber.

References Cited by the Examiner

UNITED STATES PATENTS

| | | | |
|---|---|---|---|
| 108,369 | 10/70 | Loewenstein | 71—12 |
| 163,238 | 5/75 | Painter | 23—259.1 |
| 638,919 | 12/99 | Giffen | 23—259.1 |
| 673,167 | 4/01 | Giffen | 71—12 |
| 1,178,299 | 4/16 | Cornelius | 23—259.1 |
| 1,617,014 | 2/27 | Derleth | 71—12 |

DONALL H. SYLVESTER, *Primary Examiner.*
ANTHONY SCIAMANNA, *Examiner.*